US011926232B2

(12) United States Patent
Gyland et al.

(10) Patent No.: US 11,926,232 B2
(45) Date of Patent: Mar. 12, 2024

(54) SYSTEM FOR DOCKING A SUBMARINE VESSEL TO A DOCKING PORT AND A METHOD FOR DOCKING THE SUBMARINE VESSEL ON THE DOCKING PORT

(71) Applicant: WPC Wireless Power and Communication AS, Kristiansand (NO)

(72) Inventors: Geir Olav Gyland, Kristiansand (NO); Lars Gunnar Hodnefjell, Mosterøy (NO)

(73) Assignee: WPC Wireless Power and Communication AS, Kristiansand (NO)

( * ) Notice: Subject to any disclaimer, the term of this patent is extended or adjusted under 35 U.S.C. 154(b) by 436 days.

(21) Appl. No.: 17/415,341

(22) PCT Filed: Dec. 19, 2019

(86) PCT No.: PCT/NO2019/050285
§ 371 (c)(1),
(2) Date: Jun. 17, 2021

(87) PCT Pub. No.: WO2020/130849
PCT Pub. Date: Jun. 25, 2020

(65) Prior Publication Data
US 2022/0055494 A1 Feb. 24, 2022

(30) Foreign Application Priority Data
Dec. 19, 2018 (NO) .................................. 20181653

(51) Int. Cl.
*B60L 53/36* (2019.01)
*B60L 53/12* (2019.01)
(Continued)

(52) U.S. Cl.
CPC ............... *B60L 53/36* (2019.02); *B60L 53/12* (2019.02); *B60L 53/38* (2019.02); *B60L 53/62* (2019.02);
(Continued)

(58) Field of Classification Search
CPC .......... B60L 53/36; B60L 53/12; B60L 53/38; B60L 53/62; B63G 8/001;
(Continued)

(56) References Cited

U.S. PATENT DOCUMENTS

2011/0177779 A1 7/2011 Rhodes et al.
2014/0232200 A1 8/2014 Yuji et al.
(Continued)

FOREIGN PATENT DOCUMENTS

CN 108680170 10/2018
GB 2477034 7/2011
(Continued)

OTHER PUBLICATIONS

Norwegian Search Report for NO 20181653, dated Jul. 1, 2019.
International Search Report and the Written Opinion for PCT/NO2019/050285, dated Jan. 29, 2020.

*Primary Examiner* — Anthony D Wiest
(74) *Attorney, Agent, or Firm* — Andrus Intellectual Property Law, LLP

(57) ABSTRACT

A system has a submarine vessel and a submarine docking port. The docking port is arranged for transfer of electrical energy to the submarine vessel when the submarine vessel is docked. The submarine vessel has a submarine navigation system. The docking port has a primary coil for emitting a magnetic field. The submarine vessel has a secondary coil. The submarine vessel has means for measuring a strength of the magnetic field received by the secondary coil. The submarine vessel has a positioning electronics that guides
(Continued)

the submarine vessel in a horizontal plane to maximize the measured local magnetic field. The positioning electronics guides the submarine vessel in the vertical direction when the measured magnetic field is at a local maximum and the magnetic field increases when the submarine vessel descends towards the primary coil. Also, a method is for docking a submarine vessel on a submarine docking port.

12 Claims, 5 Drawing Sheets

(51) Int. Cl.
    *B60L 53/38*     (2019.01)
    *B60L 53/62*     (2019.01)
    *B63G 8/00*     (2006.01)
    *H01F 38/14*     (2006.01)
    *H02J 50/10*     (2016.01)

(52) U.S. Cl.
    CPC ............. *B63G 8/001* (2013.01); *H01F 38/14* (2013.01); *H02J 50/10* (2016.02); *B63G 2008/004* (2013.01)

(58) Field of Classification Search
    CPC ........ B63G 2008/004; B63G 2008/008; H01F 38/14; H02J 50/10; H02J 2310/42; H02J 50/90; Y02T 10/7072; Y02T 90/14; Y02T 10/70; Y02T 90/12; G05D 1/0206
    See application file for complete search history.

(56) References Cited

U.S. PATENT DOCUMENTS

2015/0333540 A1* 11/2015 Niizuma ................. H02J 50/90
    114/312
2017/0207658 A1     7/2017 Bana et al.

FOREIGN PATENT DOCUMENTS

| | | | |
|---|---|---|---|
| JP | 2017225272 A | * | 12/2017 |
| KR | 101138859 | | 5/2012 |
| WO | 02054110 | | 7/2002 |
| WO | 2014092583 | | 6/2014 |
| WO | 2016153589 | | 9/2016 |

\* cited by examiner

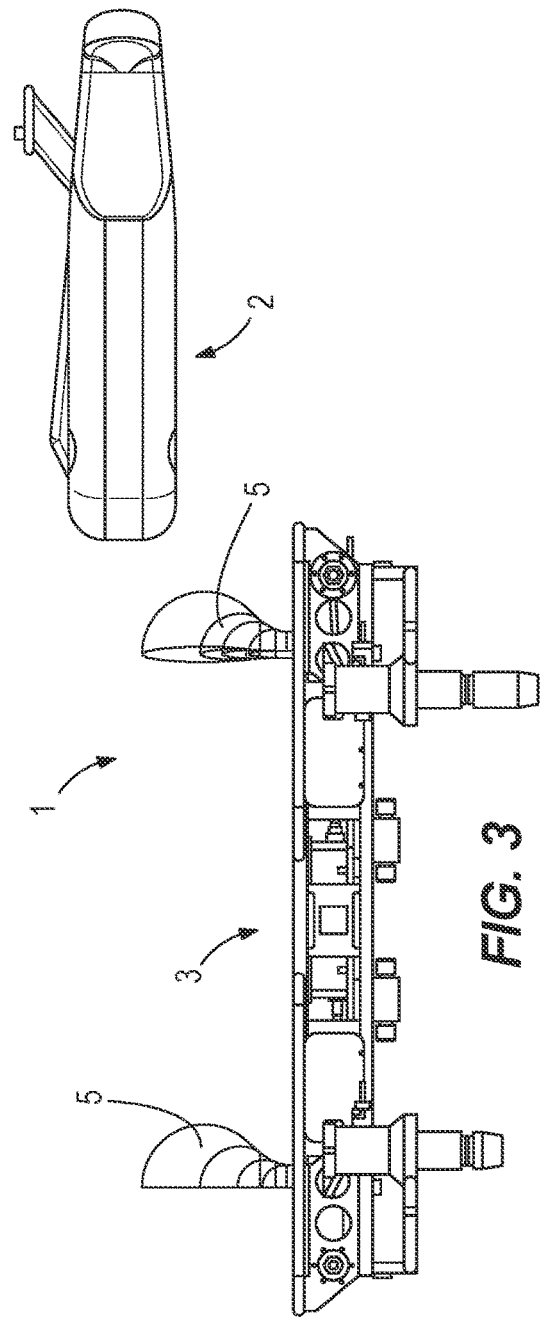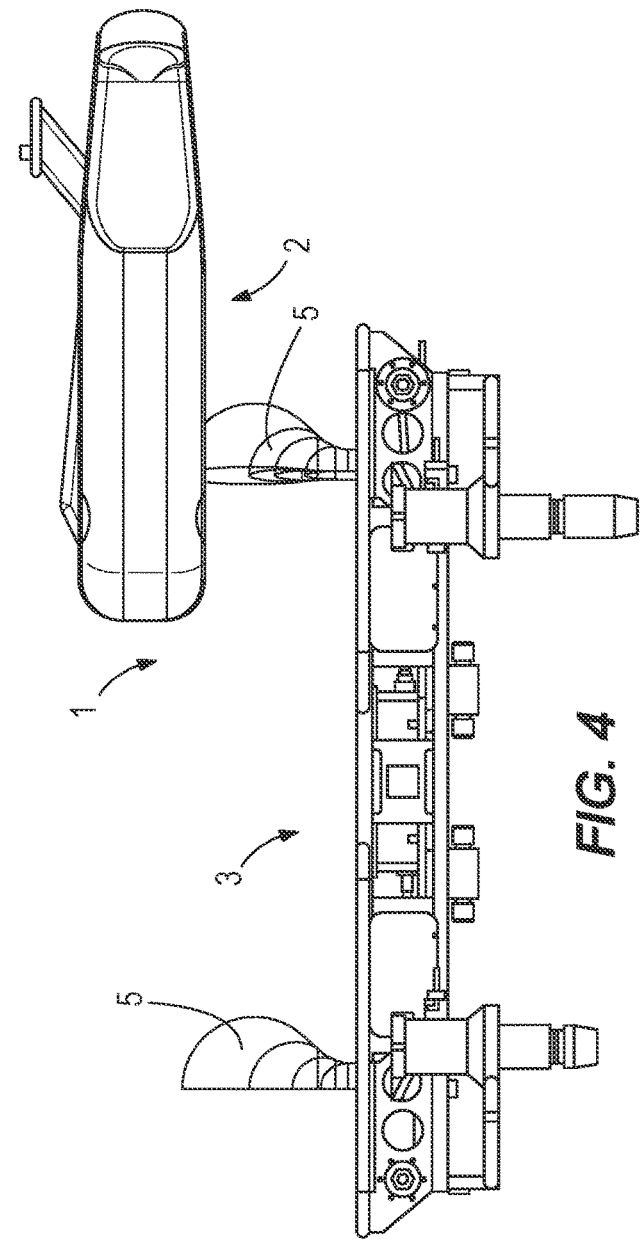

SYSTEM FOR DOCKING A SUBMARINE VESSEL TO A DOCKING PORT AND A METHOD FOR DOCKING THE SUBMARINE VESSEL ON THE DOCKING PORT

CROSS-REFERENCE TO RELATED APPLICATIONS

This application is the U.S. national stage application of International Application PCT/NO2019/050285, filed Dec. 19, 2019, which international application was published on Jun. 25, 2020, as International Publication WO 2020/130849 in the English language. The International Application claims priority of Norwegian Patent Application No. 20181653, filed Dec. 19, 2018. The international application and Norwegian application are both incorporated herein by reference, in entirety.

FIELD

The invention concerns a submarine system comprising a submarine vessel and a submarine docking port. The docking port and the submarine vessel are provided with means for wireless transfer of electrical energy by induction. The invention concerns more particularly a system for improved manoeuvring of the submarine vessel relative to the docking port such that a primary coil in the docking port is connected precisely to the secondary coil in the submarine vessel to complete the docking sequence. The invention utilizes an emitted magnetic field from the primary coil as a homing aid during the final part of the docking, and the submarine vessel is provided with means for detecting and reading the strength of the emitted magnetic field. The primary coil and the secondary coil used for the homing and docking sequence may be the primary coil and secondary coil of the inductive connector system for transfer of electrical energy to the submarine vessel.

BACKGROUND

Subsea drones or airborne drones need a precise and accurate guiding system to perform controlled docking into a charging station and onto the connector. A subsea drone may be an autonomous underwater vehicle (AUV) or an Underwater Intervention Drone (UID).

Onboard navigation systems do not have the capability to accurate position and navigate the subsea drone onto a subsea connector system. An accuracy of approximately ±10 mm and even more accurate, is sometimes needed for navigating the subsea drone in correct position relative to a connector for transferring electrical energy to the subsea drone. In some cases, a mechanical docking and lock system should be activated prior to start transferring electrical energy.

Transfer of electrical energy to a subsea drone positioned on a subsea charging station or a submarine docking port may be done wireless by an inductive connector system. A suitable inductive connector system is disclosed in WO2014092583.

An inductive connector system for drone charging consists of a primary side typically placed on the charging station and a secondary receiving part on the drone.

A subsea drone may comprise an inertial navigation system. In addition, the drone may comprise one or several cameras that form part of a visual navigation system. The docking port may be provided with symbols to aid the visual navigation system.

The accuracy of the inertial navigation system is approximately ±50 cm. The accuracy depends on the elapsed time from when a last reference position was recorded. When combined with a visual navigation system, the accuracy is improved. However, visibility under water may be quite low due to e.g. particles in the water. Particles reduce the transparency of the water, and particles may settle on structures in the water and cover surfaces intended for visual guidance. Thereby a visual navigation system may be useless. Therefore, a more precise system is needed for the final docking manoeuvre of the subsea drone onto the docking port.

The primary coil and the secondary coil in an inductive connector system for subsea use, must be protected from the ambient hydrostatic pressure. When the inductive connector system is used in a subsea drone, which may have a mass of several metric tons, the primary coil and the secondary coil must be protected from the impact of the drone when the drone lands onto the docking port. Typically, the outer part of the primary coil and the outer part of the secondary coil are surrounded by a ring-shaped enforcement to protect the coil and to help withstand the hydrostatic pressure. In some cases this might be a metal ring. This reinforcement element may distort the magnetic field when in close proximity to the emitting coil.

SUMMARY

The invention has for its object to remedy or to reduce at least one of the drawbacks of the prior art, or at least provide a useful alternative to prior art.

The object is achieved through features, which are specified in the description below and in the claims that follow.

The invention concerns the use of one or several first electrical coils positioned on the docking port. This or these first electrical coils emit a magnetic field when electrical current flow in the electrical coils. The invention further concerns a submarine vessel that is provided with means for measuring the strength of the emitted magnetic field. The means may be a at least one second electrical coil or a plurality of second electrical coils.

The first and second electrical coil may be a primary coil and a secondary coil, respectively, in a wireless connector for transferring electrical energy from the docking port to the submarine vessel.

The magnetic field may further be optimised for homing by applying dedicated electrical pulses or even limited AC power to emit a suitable magnetic field. The magnetic field may be further modulated or altered so that identification information is transmitted to the submarine vessel to verify correct charging station or docking port.

The second electrical coil may be a secondary coil in the wireless connector. The secondary electrical coil may be used to receive possible information in the magnetic field and measure the strength of the magnetic field when the submarine vessel moves within the magnetic field.

Alternative electrical coils may be used for sensitive "long range" receipt of the magnetic field.

In addition, the docking port and the submarine vessel comprise electronics which may be used as a guiding and homing system in the range of 0 to 1 m from the primary electrical coil.

When the submarine vessel is approaching the docking port, an onboard navigation system detects the docking port and enables to manoeuvre the submarine vessel to within approximately 50 cm accuracy of the docking port.

The primary coil or coils of the docking port is activated in homing mode and the submarine vessel detects the emitted magnetic field.

When the submarine vessel approaches the emitted magnetic field, identification information can be received, and correct docking port and connector are verified. The submarine vessel enters into homing mode and will use the emitted magnetic field to precisely dock onto the inductive connectors of the wireless connector.

The invention is defined by the independent patent claims. The dependent claims define advantageous embodiments of the invention.

In a first aspect the invention relates more particularly to a system comprising a submarine vessel and a submarine docking port for the submarine vessel, where the docking port is arranged for transfer of electrical energy to the submarine vessel when the submarine vessel is docked. The submarine vessel is provided with a submarine navigation system. The docking port is provided with at least one primary coil arranged for emitting a magnetic field, and the submarine vessel is provided with a secondary coil. The submarine vessel is provided with means for measuring a strength of the magnetic field received by the secondary coil, and the submarine vessel is provided with a positioning electronics that guides the submarine vessel in a horizontal plane (X-Y plane) to maximize the measured local magnetic field. The positioning electronics guides the submarine vessel in the vertical direction (Z-direction) when the measured magnetic field is at a local maximum and the magnetic field increases when the submarine vessel descends towards the primary coil. During the descent, further movements in the X-Y plane might be required to ensure that the submarine vessel is positioned in a location where the measured magnetic field is at its local maximum.

The primary coil may be a primary coil in a wireless connection for transfer of the electrical energy. The secondary coil may be a secondary coil in a wireless connection for transfer of the electrical energy.

The system may comprise a first metal ring that surrounds an outward facing portion of the primary coil. The first metal ring may protrude from a surface of the outward facing portion of the primary coil. The first metal ring may be flush with the surface of the outward facing portion of the primary coil. The first metal ring may be retracted relative to the surface of the outward facing portion of the primary coil. The system may comprise a second metal ring that surrounds an outward facing portion of the secondary coil. The second metal ring may protrude from a surface of the outward facing portion of the secondary coil. The second metal ring may be flush with the surface of the outward facing portion of the secondary coil. The second metal ring may be retracted relative to the surface of the outward facing portion of the secondary coil.

The submarine vessel may be provided with electronics which comprises a charging branch connected to the second coil. The electronics may comprise a means for inactivating the capacitance in the charging branch. Inactivation of the capacitance may be done by increasing the voltage of the circuit that comprises one or more capacitors. As an alternative, the means for inactivating the capacitance may be a switch. The switch may be a relay. The switch may be an electronical switch.

The means for inactivating the capacitance may be a step-up converter, and the electronics may be provided with a measuring branch connected to the second coil to measure the strength of the magnetic field.

The submarine navigation system may be an inertial navigation system. The submarine navigation system may be a visual or optical based navigation system. The submarine navigation system may be an acoustic based navigation system. The submarine navigation system may be a radio based navigation system.

The docking port may be arranged for transfer of electrical energy to the submarine vessel when it is docked, and the submarine vessel is provided with means for submarine navigation. The docking port may be provided with at least one first electrical coil arranged for emitting a magnetic field, and the submarine vessel may be provided with at least one receiving means for measuring the emitted magnetic field.

The at least one first electrical coil may be a primary coil in a wireless connection for transfer of the electrical energy.

The docking port may be provided with means for modulation or alteration of the magnetic field. The means for modulation or alteration of the magnetic field may be adapted for transferring information by the modulated or alternated magnetic field.

The at least one receiving means may be a second electrical coil, and the submarine vessel may be provided with means for interpretation of the magnetic field. The second electrical coil may be a secondary coil in a wireless connection for transfer of the electrical energy.

In a second aspect the invention relates more particularly to a method for docking a submarine vessel on a submarine docking port. The submarine vessel is provided with a submarine navigation system. The submarine vessel is navigated to a first position at a first distance from the docking port. At least one primary coil (41) on the docking port emits a magnetic field, and the submarine vessel is provided with electronics adapted to measure the strength of the magnetic field received by a second coil on the submarine vessel. A positioning electronics guides the submarine vessel by trial and error in the horizontal plane (X-Y plane) to locate a position where the magnetic field is at a local maximum and the positioning electronics guides the submarine vessel in the vertical direction (Z-direction) until the submarine vessel is correctly docked onto the docking port.

The submarine vessel may be provided with electronics comprising a charging branch connected to the second coil, and the method comprises to inactivate the capacitance in the charging branch by a means. The capacitance may be inactivated by activating a switch. The switch may be a relay. The switch may be an electronical switch.

The capacitance may be inactivated by increasing the voltage of the charging branch by activating a step-up converter, and the magnetic field may be measured in a measuring branch connected to the second coil.

A method for docking a submarine vessel on a submarine docking port is described. The submarine vessel may be provided with a system for submarine navigation and said submarine vessel may be navigated to a first position at a first distance from the docking port. The at least one first electrical coil on the docking port may emit a magnetic field that the submarine vessel may recognize by at least one receiving means. The receiving means may interpret the magnetic field and calculate a relative position of the submarine vessel to the emitting coil. The submarine vessel may enter a homing mode, and the receiving means may use the magnetic field to fine tune a precise landing of the submarine vessel on the docking port.

The docking port may be provided with means for modulation or alteration of the magnetic field and the receiving means. The means for modulation or alteration of the magnetic field may be adapted for transferring information by the modulated or alternated magnetic field and the receiving means may use the information for calculation.

The at least one first electrical coil may be a primary coil in a wireless connection for transfer of electrical energy. The at least one receiving means may be a second electrical coil. The second electrical coil may be a secondary coil in a wireless connection for transfer of electrical energy. The system for submarine navigation may be a system for inertial navigation.

BRIEF DESCRIPTION OF THE DRAWINGS

In the following is described examples of preferred embodiments illustrated in the accompanying drawings, wherein:

FIG. 3-5 show in sequence how the submarine vessel is homing in on the docking port using the magnetic field as a homing aid;

DETAILED DESCRIPTION OF THE DRAWINGS

Figure 1:
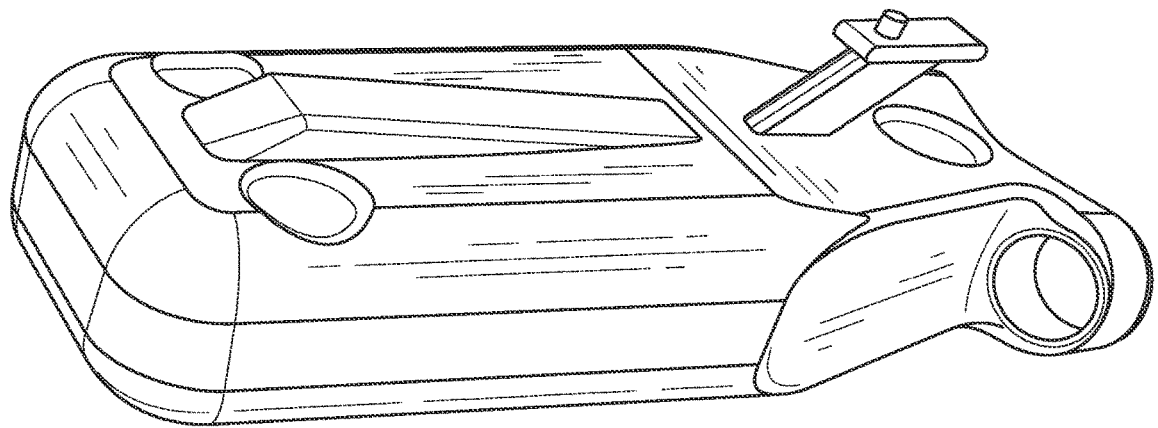
FIG. 1 shows schematically a submarine vessel, the submarine vessel is provided with a receiving means for a magnetic field.

In the drawings, the reference numeral 1 indicates a system comprising a submarine vessel 2 and a docking port 3. The submarine vessel 2 may be a self-propelling AUV. The submarine vessel 2 may comprise chargeable batteries (not shown) for operation. The submarine vessel 2 comprises an inductive connector system 4 comprising a primary electrical coil 41 and a secondary electrical coil 42 for wireless transfer of electrical energy to the batteries by inductive charging.

The docking port 3 comprises at least one primary electrical coil 41. When the primary electrical coil 41 is connected to an active electrical source, the primary electrical coil 41 emits a magnetic field 5 due to the electrical current in the primary electrical coil 41.

The second electrical coil 42 is positioned in the submarine vessel 2. The submarine vessel 2 comprises electronics 6 that interprets the emitted magnetic field 5 registered by the second electrical coil 42. One parameter to be measured is the strength of the magnetic field 5.

The docking port 3 may comprise electronics (not shown) adapted to modulate and/or to alter the emitted magnetic field 5 such that the emitted magnetic field 5 carries information. The electronics 6 of the submarine vessel 2 is adapted to read the information carried in the modulated or alternated magnetic field 5.

Figure 2:
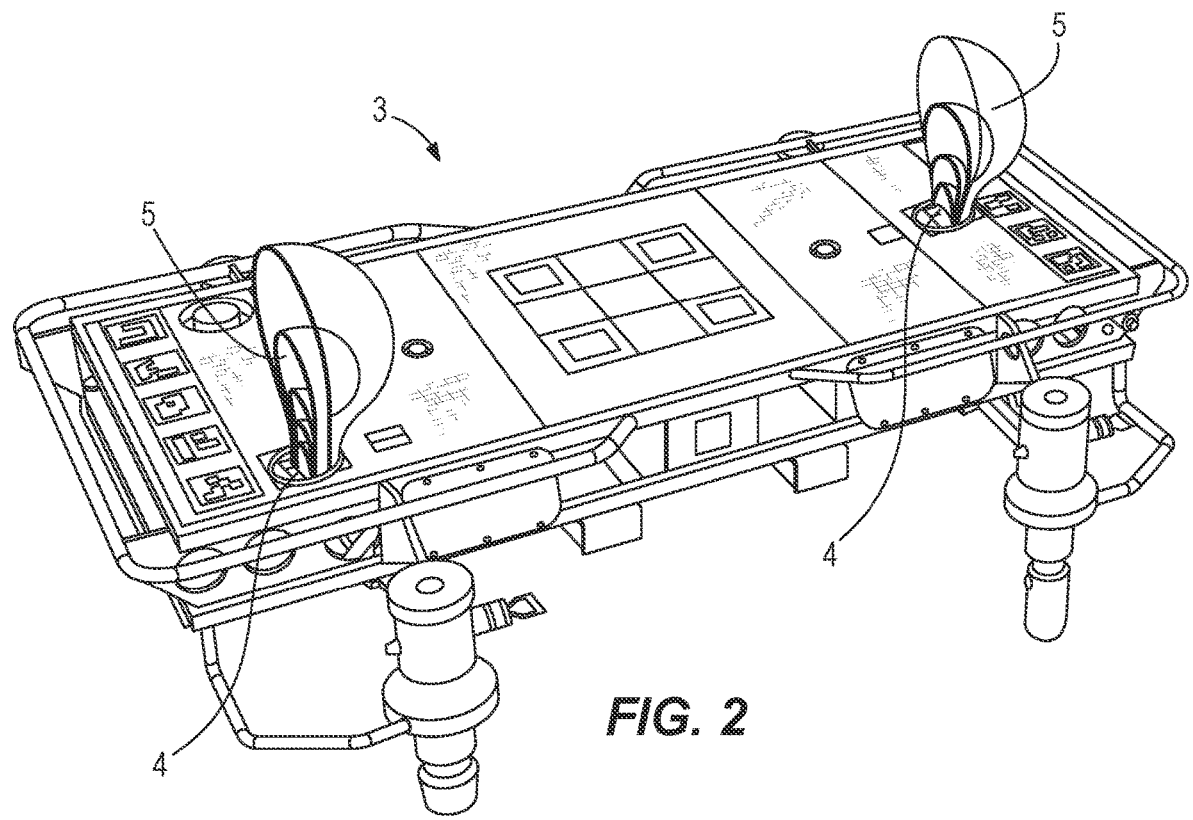
FIG. 2 shows in a different scale a submarine docking port, the submarine docking port is provided with a first electrical coil for emitting a magnetic field, said magnetic field is in the figure illustrated as cut through "bubbles"
Figure 5:
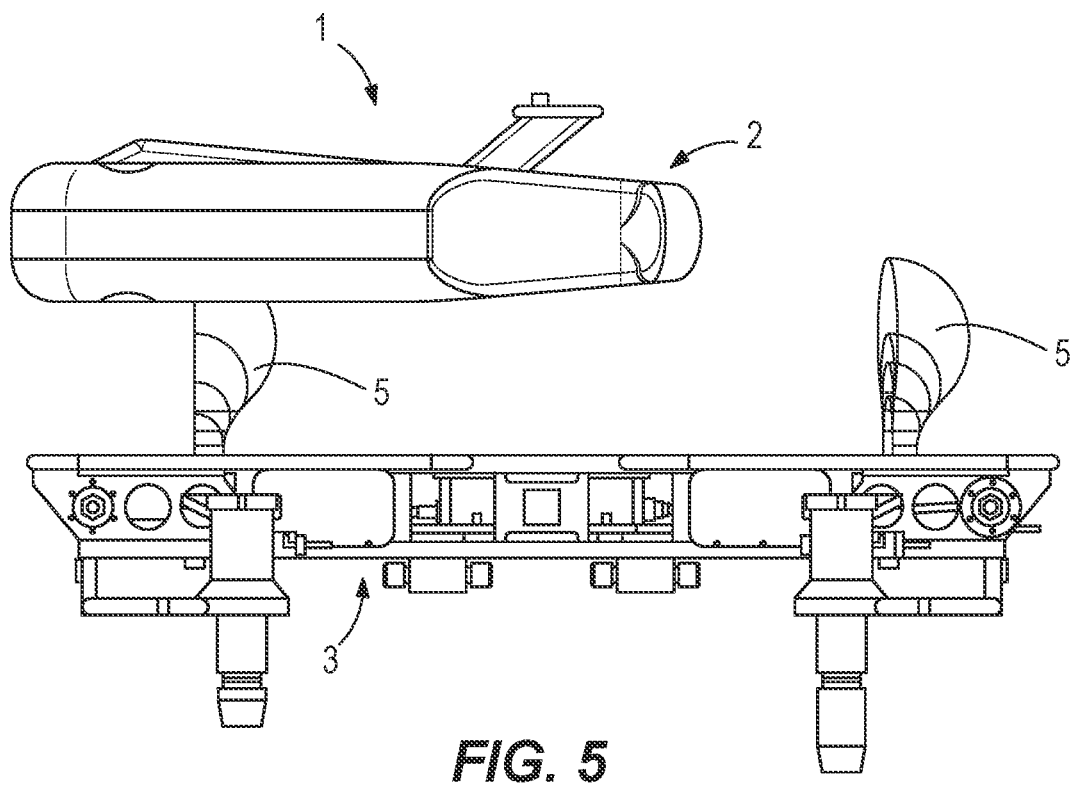

The submarine vessel 2 comprises a submarine navigation system (not shown). The submarine navigation system may be an inertial navigation system. The submarine navigation system may be a visual based navigation system in the vicinity of the docking port 3, as seen in FIG. 2 as a xx pattern. The submarine vessel 2 uses the submarine navigation system to approach the docking port 3. In the vicinity of the docking port 3, e.g. at a distance between 20 cm and 1 meter, for example at a distance of 50 cm, the submarine vessel 2 enters a homing mode and uses the emitted magnetic field 5 as a precise homing aid in addition to possible use of other submarine navigation systems to manoeuvre itself relative to the docking port 3. Other possible submarine navigation systems that may be combined with the magnetic homing are an inertial navigation system, a visual or optical based system, an acoustic based system and a radio based system.

Figure 6:
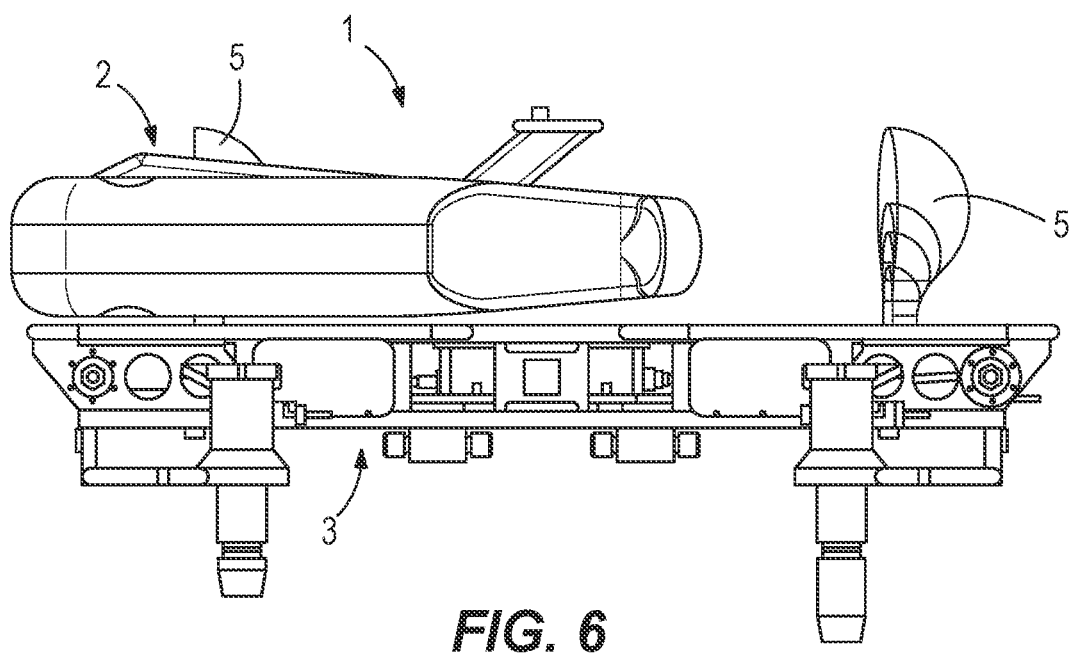
FIG. 6 shows the submarine vessel precisely positioned and resting on the docking port.

When the submarine vessel 2 is in correct position, i.e. the primary coil 41 and the secondary coil 42 are aligned, the submarine vessel 2 lowers itself onto a precise position on the docking port 3, as shown in FIG. 6.

Figure 7A:
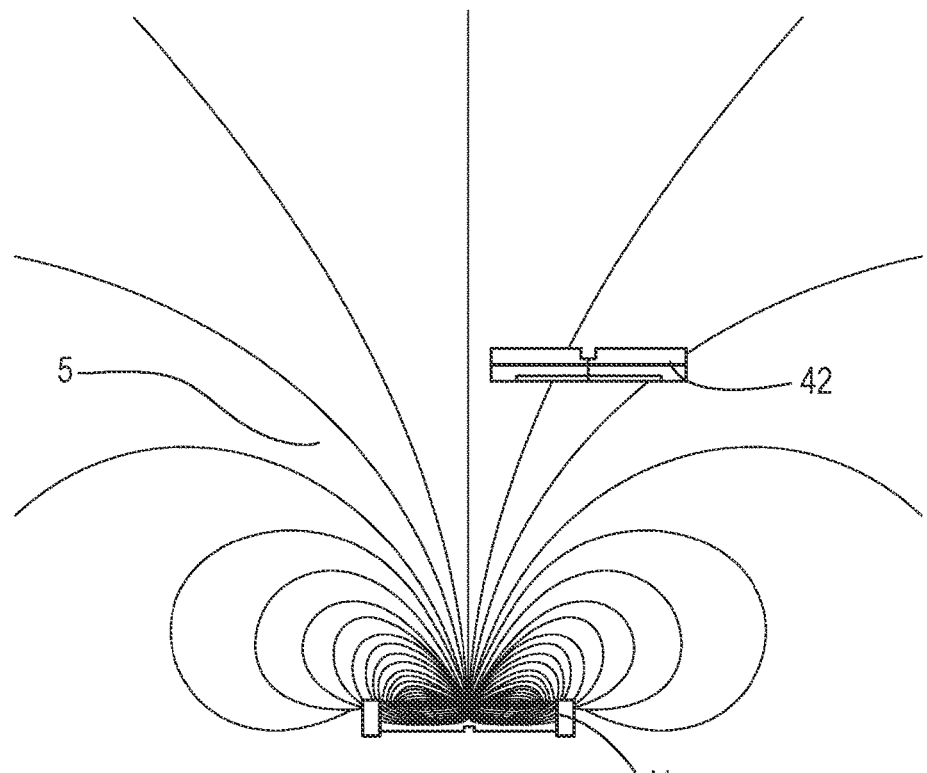
FIG. 7A-B show schematically a primary coil and a secondary coil, and a magnetic field emitted from the primary coil.
Figure 7B:
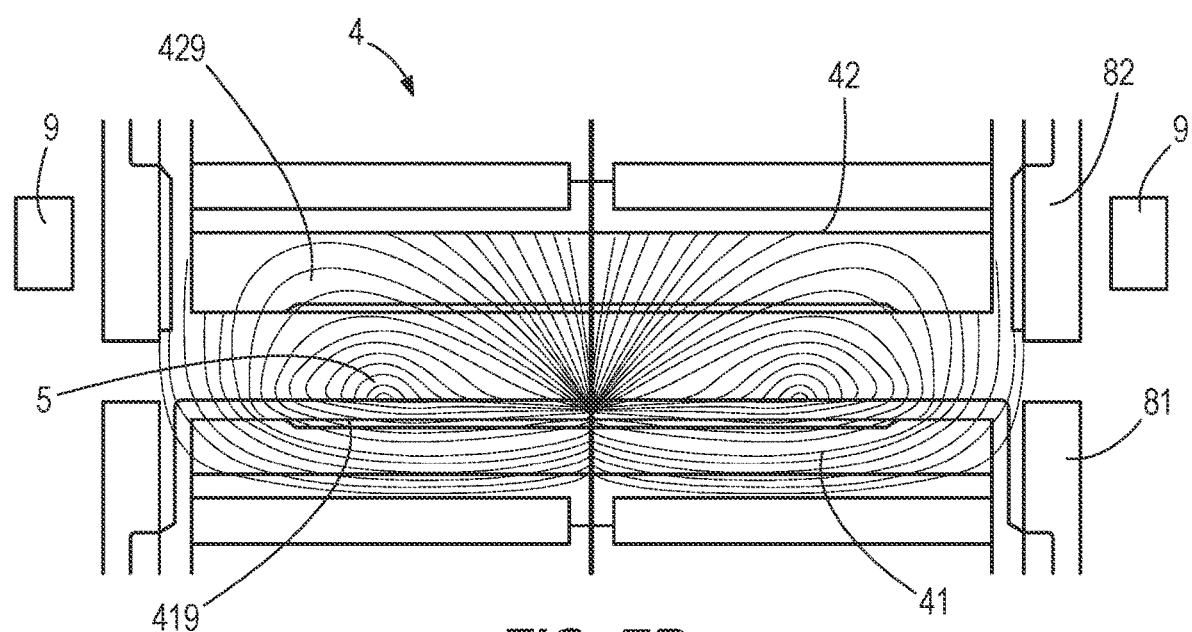

FIG. 7A shows the magnetic field 5 emitted from the primary coil 41. The secondary coil 42 is positioned in the magnetic field 5 at a distance from the primary coil 41. In FIG. 7B the secondary coil 42 is positioned in a close vicinity of the primary coil 41, i.e. the secondary coil 42 is close to be in a position where electrical energy may be transferred from the primary coil 41 to the secondary coil 42. The outward facing portion 419 of the primary coil 41 is surrounded by a first metal ring 81. The outward facing portion 429 of the secondary coil 42 is surrounded by a second metal ring 82. In addition, the submarine vessel 2 may be provided with optionally X-Y sensors 9.

The first metal ring 81 may in one embodiment project a distance from the surface of the outward facing portion 419 as shown in FIG. 7B. In an alternative embodiment the first metal ring 81 may be flush with the surface of the outward facing portion 419. In a further alternative embodiment, the first metal ring 81 may be retracted relative to the surface of the outward facing portion 419. The second metal ring 82 may project a distance from the surface of the outward facing portion 429 as shown in FIG. 7B. In an alternative embodiment the second metal ring 82 may be flush with the surface of the outward facing portion 429. In a further alternative embodiment, the second metal ring 82 may be retracted relative to the surface of the outward facing portion 429. The first metal ring 81 and the second metal ring 82 may abut when the submarine 2 is in correct position relative to the docking port 3 such that charging may commence by the inductive connector system 4.

As seen from FIG. 7A, the X-Y sensors 9 are positioned to measure the magnetic field 5 when there is a distance between the primary coil 41 and the secondary coil 42. However, when the primary coil 41 and the secondary coil 42 are close as shown in FIG. 7B, the magnetic field 5 is distorted by the second metal ring 82 and may even be short-circuited by the second metal ring 82. Thereby the X-Y sensors 9 are screened from the magnetic field 5 or not able to make sensible readings of the strength or magnitude of the magnetic field 5.

Figure 8:
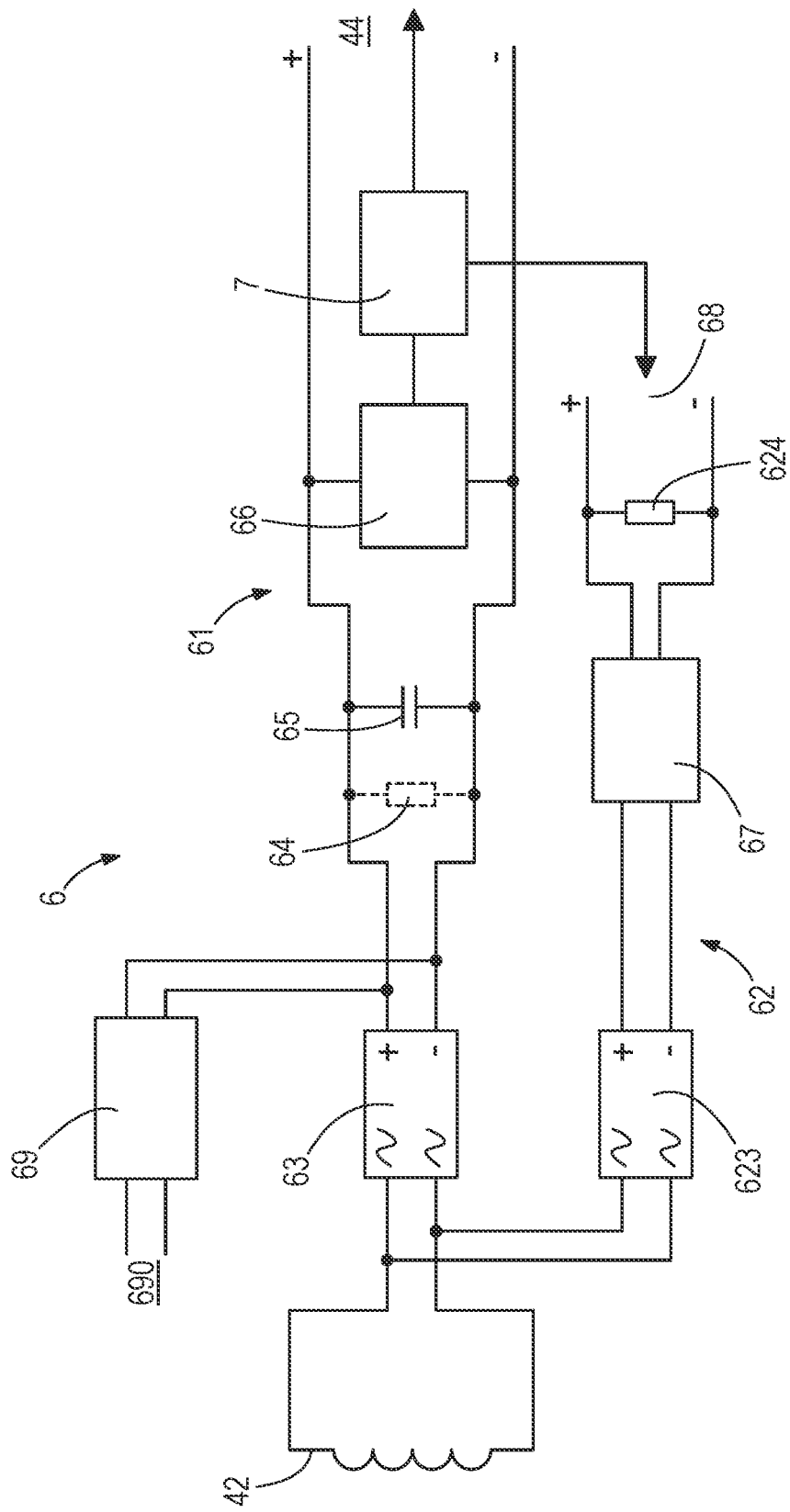
FIG. 8 shows a schematic diagram on the secondary side of an inductive connector system.

Parts of the electronics 6 of the submarine vessel 2 are shown in FIG. 8. The electronics 6 comprises a charging branch 61 between the secondary coil 42 and a power output 44. The charging branch 61 comprises a rectifier 63, an optional resistor 64, a capacitor 65 and a voltage converter 66. The voltage converter 66 supplies a control electronic 7 with low voltage electrical power.

The electronics 6 comprises a measuring branch 62. The measuring branch 62 branches from the charging branch 61 between the secondary coil 42 and the rectifier 63. The measuring branch 62 comprises a rectifier 623, a level converter 67 and a resistor 624. The measuring branch 62 delivers a low voltage output signal at a connection 68. The control electronics 7 is adapted to read the output signal at the connection 68. The strength of the output signal is a measurement of the strength of the magnetic field 5 that is received by the secondary coil 42.

The electronics 6 comprises a means for inactivating the capacitor 65. The means is shown as a step-up converter 69. The step-up converter 69 is at the input side supplied by a low voltage energy source 690. The low voltage energy source 690 may be a battery (not shown). The step-up converter 69 is on the output side connected to the charging branch 61 between the rectifier 63 and the capacitor 65, or alternatively between the rectifier 63 and the optional resistor 64.

The control electronics 7 communicates with a positioning electronics (not shown) of the submarine vessel 2.

The secondary coil 42 is used to measure a portion of the local magnetic field emitted from the primary coil (41). In homing mode, the primary coil (41) operates at reduced power to save energy. The magnitude of the low output voltage signal at the connection 68 is dependent on the distance to the primary coil (41). When the secondary coil (42) is used in the inductive connector system 4 to receive electrical power, it is necessary to provide the charging branch 61 with one or more capacitors (65) with high capacitance. The charging branch 61 may be used for a dual purpose. The charging branch 61 may measure the strength of the magnetic field 5 and the charging branch may be used to transfer electrical power. However, a significant time delay in the measurements will occur due to the capacitors (65). Such time delay is undesirable and a problem when positioning the submarine vessel 2.

The capacitance may be inactivated by the means. The means may comprise a switch (not shown) or the like. A switch may also be used to inactivate other parts of the electronics 6 that may cause a time delay in the measurements.

In an alternative embodiment, the means comprises the step-up converter 69. The step-up converter 69 induces a higher voltage to the capacitor 65 than is used in the voltage range for measuring the distance to the primary coil 41. Thereby the capacitor 65 is not charged and discharged during the measuring of distance. This also has the advantage that no switch is needed and the control electronic 7 is supplied with power from the voltage converter 66. In addition, the measuring branch 62 does not contain a capacitor and is used to measure the local magnetic field 5 without time delay.

When the primary coil 41 and the secondary coil 42 are aligned and in correct position as determined by the first metal ring 81 and the second metal ring 82, the secondary coil 42 will deliver a voltage that is higher than the voltage delivered by the step-up converter 69. Thereby the electronic 6 may swap from a measurement mode to a power supply mode. This swap of mode is a robust action.

The first metal ring 81 and the second metal ring 82 secure that the inductive connector system is not damaged in case of a hard impact from the submarine vessel 2 onto the docking port 3 during docking. The submarine vessel 2 may descend towards the docking port 3 at an angle. Due to the protection provided by the first metal ring 81 and the second metal ring 82.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A system comprising a submarine vessel and a submarine docking port for the submarine vessel, where the docking port is arranged for transfer of electrical energy to the submarine vessel when the submarine vessel is docked, and the submarine vessel is provided with a submarine navigation system, wherein the docking port is provided with at least one primary coil arranged for emitting a magnetic field, and the submarine vessel is provided with a secondary coil, the submarine vessel is provided with means for measuring a strength of the magnetic field received by the secondary coil, and the submarine vessel is provided with a positioning electronics that guides the submarine vessel in a horizontal plane (X-Y plane) to maximize the measured local magnetic field, and the positioning electronics guides the submarine vessel in the vertical direction (Z-direction) when the measured magnetic field is at a local maximum and the magnetic field increases when the submarine vessel descends towards the primary coil.

2. The system according to claim 1, wherein the primary coil is a primary coil in a wireless connection for transfer of the electrical energy.

3. The system according to claim 1, wherein the system comprises a first metal ring that surrounds an outward facing portion of the primary coil.

4. The system according to claim 1, wherein the system comprises a second metal ring that surrounds an outward facing portion of the secondary coil.

5. The system according to claim 1 any of the preceding claims, wherein the submarine vessel is provided with an electronics comprising a charging branch connected to the second coil, and said electronics comprises a means for inactivating a capacitance in the charging branch.

6. The system according to claim 5, wherein said means is a switch.

7. The system according to claim 5, wherein said means is a step-up converter, and the electronics is provided with a measuring branch connected to the second coil.

8. The system according to claim 1, wherein the submarine navigation system is an inertial navigation system.

9. A method for docking a submarine vessel on a submarine docking port, said submarine vessel is being provided with a submarine navigation system, the method comprising navigating said submarine vessel to a first position at a first distance from the docking port, wherein at least one primary coil on the docking port emits a magnetic field, and wherein the submarine vessel is provided with an electronics adapted to measure the strength of the magnetic field received by a second coil on the sub-marine vessel, wherein a positioning electronics guides the submarine vessel by trial and error in the horizontal plane (X-Y plane) to locate a position where the magnetic field is at a local maximum and wherein the positioning electronics guides the submarine vessel in the vertical direction (Z-direction) until the submarine vessel is correctly docketed onto the docking port.

10. The method according to claim 9, wherein the submarine vessel is provided with an electronics comprising a charging branch connected to the second coil, and the method comprises to inactivate a capacitance in the charging branch by a means.

11. The method according to claim 10, wherein the capacitance is inactivated by activating a switch.

12. The method according to claim 10, wherein the capacitor is inactivated by increasing the voltage of the charging branch by activating a step-up converter, and the magnetic field is measured in a measuring branch connected to the second coil.

\* \* \* \* \*

UNITED STATES PATENT AND TRADEMARK OFFICE
CERTIFICATE OF CORRECTION

PATENT NO. : 11,926,232 B2
APPLICATION NO. : 17/415341
DATED : March 12, 2024
INVENTOR(S) : Geir Olav Gyland and Lars Gunnar Hodnefjell It is certified that error appears in the above-identified patent and that said Letters Patent is hereby corrected as shown below:

In the Claims

Column 8, Lines 39-40 of Claim 5:
"The system according to claim 1 any of the preceding claims, wherein..."
Should instead read:
--The system according to claim 1, wherein...--

Column 8, Line 52 of Claim 9:
"...submarine vessel is being..."
Should instead read:
--...submarine vessel being...--

Signed and Sealed this
Eleventh Day of June, 2024

Katherine Kelly Vidal
*Director of the United States Patent and Trademark Office*